United States Patent

[11] 3,576,435

| [72] | Inventor | Robert J. Ehret |
| | | Los Altos, Calif. |
| [21] | Appl. No. | 649,196 |
| [22] | Filed | June 27, 1967 |
| [45] | Patented | Apr. 27, 1971 |
| [73] | Assignee | Beckman Instruments, Inc. |

[54] SQUARED FUNCTION INTEGRATOR
7 Claims, 2 Drawing Figs.

[52] U.S. Cl. ................................................ 235/156,
235/183, 328/38
[51] Int. Cl. .................................................. G06f 7/48,
H03k 5/156
[50] Field of Search............................................ 235/156,
152, 164, 183, 92, 193, 194; 73/61.4; 328/38, 39,
41; 324/70

[56] References Cited
UNITED STATES PATENTS

| 3,018,440 | 1/1962 | Cumings.................. | 328/41 |
| 3,480,207 | 11/1969 | Strohmaier................. | 324/70X |
| 2,941,151 | 6/1960 | Goldbohm et al. ........... | 328/39 |
| 3,418,582 | 12/1968 | Davies........................ | 328/39 |
| 3,103,578 | 9/1963 | Dietrich, Jr................. | 235/194 |
| 3,126,476 | 3/1964 | Pariser et al.................. | 235/164 |
| 2,885,188 | 5/1959 | Pickels et al................. | 73/61.4X |
| 2,496,912 | 2/1950 | Grosdoff ..................... | 235/156 |
| 2,986,728 | 5/1961 | Hinckley..................... | 235/164X |
| 2,962,214 | 11/1960 | Gordon et al................. | 235/164 |
| 3,097,340 | 7/1963 | Dobbie........................ | 328/63 |

*Primary Examiner*—Malcolm A. Morrison
*Assistant Examiner*—David H. Malzahn
*Attorneys*—Robert J. Steinmeyer and Richard M. Jennings ABSTRACT: A system for producing a signal proportional to the square of an input signal of frequency $f$ which varies as a linear function of some variable, such as angular velocity $\omega$ for measurements of $\int \omega^2 dt$ in interpreting sedimentation rate separations in centrifugal gradients, comprising a pulse generator having a fixed period triggered by a frequency divider connected to the input signal and a gate enabled by the pulses generated to periodically transmit the input signal to an accumulator.

ROBERT J. EHRET
*INVENTOR.*

BY *A. M. Fernandez*

ATTORNEY

SQUARED FUNCTION INTEGRATOR

This invention relates to a system for producing a signal proportional to the square of a function and proportional to the integral of the square of the function.

In many applications for instrumentation, it is often desirable to be able to measure some variable and produce a signal proportional to the square of the variable, and sometimes to produce a signal proportional to the integral of the square of the variable. For instance, the sedimentation rate separation in centrifugal gradients can be predicted or interpreted by a numerical integration. For that purpose, a series of tables usable for a wide range of rotor dimensions may be constructed such that knowing temperature, particle volume and concentration, the numerical values of $\int s\omega^2 dt$ (obtained by extrapolation of the linear gradient to zero radius) may be determined by simply measuring or specifying radius $s$ and $\int \omega^2 dt$. The problem with interpreting sedimentation rate separations in that or some similar manner is that the measurement of $\int \omega^2 dt$ is required. It would be advantageous to be able to produce a signal proportional to the square of angular velocity for integration during centrifugation.

An object of this invention is to provide a system for producing a signal proportional to the square of a signal frequency which varies as a linear function of some variable.

A further object of this invention is to provide a system for accumulating cycles of a signal proportional to the square of a signal frequency which varies as a linear function of some variable.

In accordance with the present invention, an input signal the frequency $f$ of which varies as a linear function of some variable is applied to a frequency divider. The signal output of the divider triggers a pulse generator the output of which has a fixed duration $T_1$. A gate is enabled by pulses from the generator to periodically transmit the input signal to an accumulator. Since the period $T_2$ between generated pulses is a function of the input signal frequency $f$, the total number of cycles of the input signal transmitted by the gate is proportional to $\int f^2 dt$. If the frequency $f$ of the input signal varies as a linear function of some variable such as angular velocity, the total number accumulated is proportional to the integral of the variable squared.

Further objects and advantages of the present invention will become more apparent from the following description in conjunction with the drawings in which.

Figure 1:
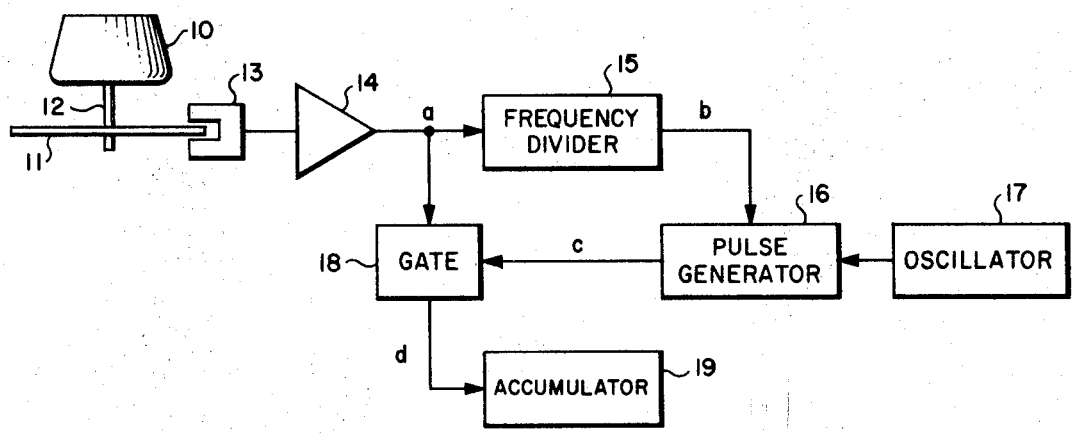
FIG. 1 is a block diagram illustrating the present invention.

Although the present invention is illustrated in FIG. 1 in conjunction with a centrifugal rotor 10 having a disc 11 connected to its shaft 12, and a transducer 13 magnetically or optically coupled to the disc 11 for the purpose of deriving a signal having a frequency $f$ which varies as a linear function of the angular velocity of the shaft 12, it should be understood that the present invention may be advantageously employed with other transducers for other applications, including applications involving linear velocity or other detectable variables. The only restriction on the transducer is that the input signal derived therefrom have a frequency which varies as a linear function of some variable.

Figure 2:
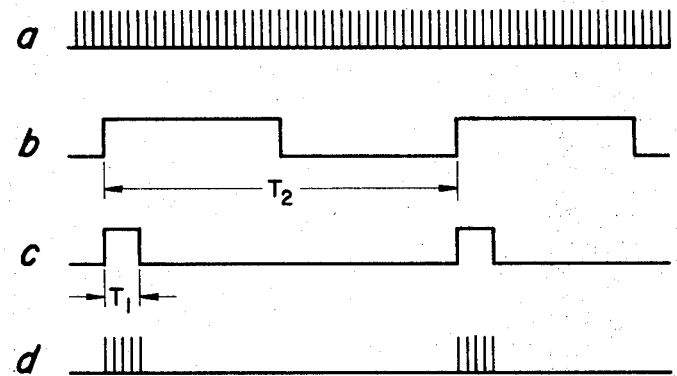
FIG. 2 is a waveform diagram showing the operation of the present invention illustrated in FIG. 1.

An amplifier 14 is preferably employed to couple the input signal source or transducer 13 to a frequency divider 15 in order that each cycle of the input signal may be shaped into a more discrete pulse generally illustrated by short vertical lines in the waveform a of FIG. 2. However, the need for such an amplifier, and its particular design, will largely depend upon the nature of the signal derived from the transducer 13. For instance, if it is sinusoidal, the amplifier 14 may consist of a class C input stage for producing a square wave, followed by a differentiating network for deriving sharp pulses, one for each cycle, such that the input signal to the frequency divider 15 will consist of discrete pulses as shown by the waveform a the frequency of which varies as a linear function of the variable being detected.

The frequency divider 15 may consist of a high frequency binary counter, such as a counter having ten stages to divide the input frequency by a factor $2^{10}$. The output signal of the frequency divider is a waveform $b$ having a period $T_2$ (as illustrated in FIG. 2) which is a linear function of the input frequency and therefore, in the illustrative embodiment, a linear function of angular velocity $\omega$.

The output signal of the frequency divider 15 triggers a pulse generator 16 to produce one pulse of a fixed duration $T_1$ for each cycle. Thus, the pulse repetition rate at the output of the pulse generator 16 varies as a linear function of the variable $\omega$.

The pulse generator 16 may consist of a conventional monostable multivibrator but since it is difficult to design such a pulse generator which will produce an output pulse of a fixed duration independent of variations in such parameters as bias voltages and ambient temperature, it is preferable to employ a bistable multivibrator set by the output signal of the frequency divider 15 and reset by a pulse from a crystal stabilized oscillator 17.

In a preferred implementation of the illustrated embodiment, the frequency of the oscillator 17 is selected to be 58.877 kHz. for direct reading of the square of angular velocity ($\omega^2$) in radians. A frequency divider comprising a high speed binary counter having fourteen stages for dividing the frequency of the oscillator by a factor of $2^{14}$ is then employed to determine the time for resetting the bistable multivibrator. That may be accomplished by using a gate enabled to transmit pulses from the oscillator 17 to the 14-stage frequency divider by the bistable multivibrator when it is set. Conventional RC coupling may be employed between the frequency divider and the reset input terminal of the bistable multivibrator; also between the frequency divider 15 and the set input terminal of bistable multivibrator.

Although a specific design for the pulse generator has been described, it should be clearly understood that a pulse generator of any design may be employed particularly if it produces a pulse having a duration which will not vary by an amount more than a fraction of the duration of one cycle of the input signal to the frequency divider 15.

The output pulse from the generator 16 enables a gate 18 to transmit the input signal to an accumulator 19 as illustrated by the waveform $d$ of FIG. 2. The accumulator may consist of an electronic counter or an electromagnetic counter coupled directly to the gate 18 or through a frequency divider; in latter case the frequency divider is part of the accumulator.

Since the duration of the pulses from the generator 16 is fixed, but the rate at which such pulses are generated does vary as a linear function of angular velocity $\omega$, it may be readily appreciated that if the angular velocity is increased by a factor of 2, such that the input signal illustrated by the waveform $a$ is doubled in frequency, the pulses transmitted to the accumulator over a given period of time increases by a factor of 4, not 2. This is because twice as many cycles of the input signal are transmitted to the accumulator 19 by each pulse from the generator 16 and the repetition rate of the pulses from the generator 16 is also doubled. Accordingly, the output signal of the gate 18 is proportional to the square of angular velocity. This may be mathematically demonstrated by substituting for the frequency F of the input signal, the notation $n/t$ to represent the number $n$ of cycles or pulses per second $t$. Since the period $T_2$ of the frequency divider 15 is given by the following equation:

$$T_2 = \frac{1}{\frac{n}{K_1 t}} = \frac{K_1 t}{n} \quad (1)$$

where $K_1$ is the factor of the frequency divider 15, the pulse rate transmitted by the gate 18 is given by the following equation:

$$\frac{n}{t}\left(\frac{T_1}{T_2}\right) = \frac{n}{t}\left(\frac{T_1 n}{K_1 t}\right) = \left(\frac{n}{t}\right)^2 \frac{T_1}{K_1} \qquad (2)$$

since $T_1$ is a constant, the output of the gate 18 is proportional to $(n/t)2$ since $n/t$ is the frequency $f$ of the input signal which varies as a linear function of angular velocity $\omega$, the output of the gate 18 is proportional to $\omega^2$. Thus, the total number of pulses in a given time T will be:

$$\int_0^T \left(\frac{n}{t}\right)^2 \frac{T_1}{K_1} dt = \int_0^T \omega^2 dt \qquad (3)$$

In some applications it may be desirable to provide for different ranges of operation by some means for varying the duration $T_1$ of the pulses from the generator 16, or the scaling factor of the frequency divider 15. Scaling may also be accomplished by providing a plurality of frequency dividers in the accumulator 19 any predetermined number of such frequency dividers being selectively connected in series by a switch for a desired range of operation.

While the principles of the invention have now been made clear in an illustrative embodiment, there will be immediately obvious to those skilled in the art many modifications in the arrangement and components used which are particularly adapted for a particular illustrative application without departing from those principles. The appended claims are, therefore, intended to cover and embrace any such modifications within the limits only of the true spirit and scope of the invention.

I claim:

1. An apparatus for producing a signal proportional to the square of a variable represented by a pulse input signal the frequency of which varies as a linear function of the variable, the combination comprising:

a frequency divider;
a gate having first and second input terminals;
the pulse input signal being simultaneously coupled to said frequency divider and to said first input terminal of said gate;
a pulse generator means connected to the output of said frequency divider for generating a pulse having a fixed duration greater than the time interval between two successive input pulses and less than the minimum period of one cycle of said frequency divider in response to each output signal from said frequency divider; and,
means for connecting the output of said pulse generator means to the second input terminal of said gate whereby said gate is enabled to transmit a plurality of pulses proportional to the square of the input signal frequency.

2. An apparatus as described in claim 1, wherein said pulse generator means comprises a bistable multivibrator which is set by each output signal provided by said frequency divider and further comprising an oscillator connected to said bistable multivibrator for resetting said bistable multivibrator after a predetermined period of time.

3. In apparatus as described in claim 1, the combination further comprising a transducer for producing said input signal in response to the rotation of a shaft.

4. In apparatus as described in claim 3, the combination further comprising a centrifuge rotor connected to said shaft.

5. In apparatus as described in claim 1, the combination further comprising an accumulator connected to the output of said gate whereby the accumulated pulses of the signal transmitted by said gate over a given period of time is proportional to the integral of the square of the input signal frequency.

6. In apparatus as described in claim 5, the combination further comprising a transducer for producing said input signal in response to the rotation of a shaft.

7. In apparatus as described in claim 6, the combination further comprising a centrifuge rotor connected to said shaft.